United States Patent Office 3,371,735
Patented Mar. 5, 1968

3,371,735
DEVICE FOR LOCKING TRACKED VEHICLES, IN PARTICULAR EXCAVATORS AND THE LIKE
Arturo Masera, Via Trieste 22, Piacenza, Italy
Filed Apr. 18, 1966, Ser. No. 543,338
Claims priority, application Italy, Apr. 24, 1965, 3,946/65
7 Claims. (Cl. 180—9.62)

ABSTRACT OF THE DISCLOSURE

A locking device for a tracked vehicle wherein a slidable member is mounted in the frame and guided for movement toward and away from the driving gear wheel in a direction generally radially of the wheel. The slidable member has a tooth structure on its one end for moving into mesh relationship with the teeth of the gear wheel when moved in one direction and out of mesh with the gear wheel when moved in the other direction. A hydraulic system is provided to drive the slidable member.

---

The present invention concerns a device for locking tracked vehicles in general, and in particular excavators, self-propelled cranes and the like.

With particular, however not exclusive, reference to the excavators, it is required, during the digging operation, that the vehicle be maintained in the proper position and not shift under the stress exerted by the bucket. This essential condition is not attained, as required, in the conventional tracked vehicles, inasmuch as the latter are locked by means of the conventional packing brakes. Said brakes have proved to be ineffective, since they have been conceived in function of the vehicle's speed while overlooking the remarkable stress occurring during the bucket operation. Moreover, the packings of said brakes undergo a rapid decay, thus causing further inconveniences, particularly when the vehicle operates on inclined ground. In this case, in addition to the vehicle's weight, there is also the stress exerted by the bucket, or the like.

Object of the invention is to provide a device which, besides obviating the above mentioned drawbacks, will secure in a simple and rational way, the locking of tracks while not feeling the effects of the difficult operational conditions, and will prove to be always efficient.

Said device is characterized in that the gearwheels for the vehicle tracks are at least partially combined with sliders running in guides provided in the vehicle frame and showing shaped surfaces apt to engage with the toothings of said wheels, whereas driving means, ending in the vehicle control place, join with said sliders in order to engage and disengage them from the considered wheels.

Profitably the shaped ends of the sliders engage the toothing of the driving wheels of the tracks and are operatively connected with respective cylinder-piston groups fed by a fluid source pressurized through a distributor arranged in the vehicle driving place.

This invention will now be explained by the following description which refers to the enclosed drawing, given only by way of example, wherein.

Figure 1:
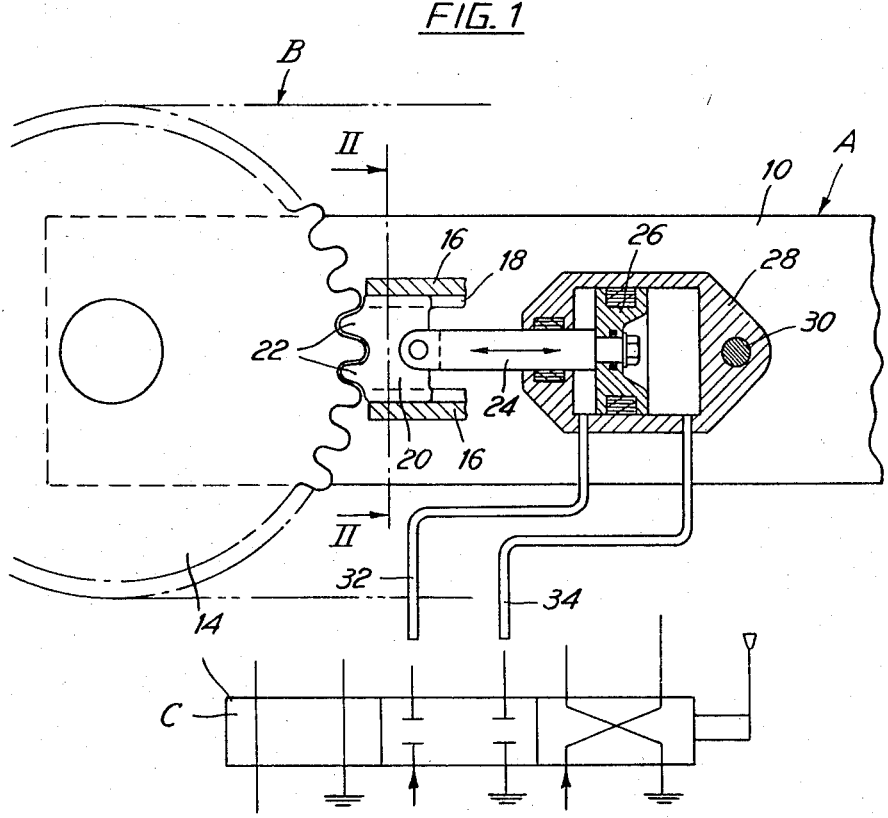
FIGURE 1 shows one of the tracked vehicle's ends with the driving wheel provided with the locking device.
Figure 2:
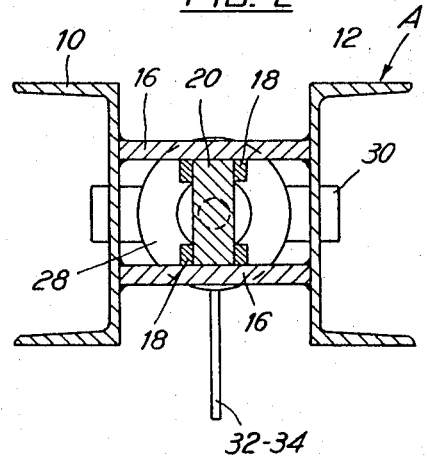
FIGURE 2 is a section made along the line II—II of FIGURE 1.

With reference to said figures, A indicates the tracked vehicle's framework, constituted in the known manner by side members 10-12 properly spaced between each other, to hold, also in the known way, the gearwheel 14 whereon the respective track B winds itself.

Plates 16 are fixed between side members 10 and 12. Such plates 16 carry guides 18 for a slider 20. The latter is constituted, in the illustrated case, by a block provided at one of its ends with toothing 22 engageable in a portion of the spaces occurring in the driving wheel's (14) toothing. At the other free end, the slider 20 is connected with the stem 24 of a piston 26, whose cylinder 28 is held, by means of a pin 30, by the two side members 10 and 12.

The chambers of cylinder 28 are connected through pipes 32 and 34 with a distributor C of the three-section type, arranged in such a way as to be controlled by the driver of the vehicle. The extreme sections of said distributor serve for connecting both chambers of the pistons 26 with the pressure source and with the discharge whereas the intermediate section helps to close wholly the communication of said chambers, thus keeping the piston 26 in the desired position.

Considering that the just described basic device is applied to both driving wheels 14 of the tracked vehicle, it follows, on the basis of the foregoing, that the operation of piston 26 engages toothing 22 of both sliders 20 with the spaces of the toothing occurring in the respective wheels 14, so that said wheels are locked, while securing the vehicle's stability even when remarkable stresses are exerted thereupon.

When reversing the feeding of the chambers of cylinders 28, the sliders 20 are disengaged from the wheels 14, thus permitting the shifting of the vehicle.

Modifications and variations can be applied to the described and illustrated device; for instance, spring means could be arranged between stem 24 and slider 20, in order to secure the engagement of teeth 22 in the spaces of the wheel 14, even when said spaces are not meshing perfectly with the teeth; sliders 20 could be combined with latches controlled by the displacement of the piston 26, in order to avoid the reverse motion of said sliders.

Distributor C could be combined with locking members in order to avoid wrong manoeuvres. For instance the gear lever of the vehicle could be joined with the distributor C, so as to achieve the disengagement of the sliders 20 from the wheels 14 before actuating the gear for inserting any one speed.

It is to be understood that the present protection covers also the vehicle incorporating the just considered device.

The execution details may be varied without departing from the scope of the invention and thus from the domain of the patent.

I claim:
1. In a tracked vehicle, a track, a frame, a toothed gear wheel rotatably mounted in said frame and engaging the track for driving the same, a slide member having at one end a tooth structure adapted to mesh with the teeth of said gear wheel, means carried by said frame for guiding said slide member in movement substantially radially of said gear wheel, and power means for moving said slide along said guide means toward and away from the periphery of said gear wheel whereby to move said tooth structure into engagement with the teeth of the gear wheel to lock the vehicle and out of engagement with the teeth gear wheel to unlock the vehicle.

2. A locking device as set forth in claim 1 wherein said power means includes a cylinder and piston and wherein said slide member is connected to said piston.

3. A locking device as set forth in claim 1 wherein said frame includes a pair of side members and said guide means is attached to said side members.

4. A locking device as set forth in claim 2 including a means for connecting the interior of said cylinder on either side of said piston with a fluid pressure source or with a fluid discharge.

5. A locking device as set forth in claim 4 wherein said last mentioned means includes means for blocking the flow of fluid to or from either side of said piston, to lock said slide member against sliding movement along said guide means.

6. A locking device as set forth in claim 3 wherein a pair of top and bottom plates are mounted between said side members and parallel guides are mounted on adjacent sides of said plates and wherein said slide member is disposed between said guides and is movable therealong.

7. A locking device as set forth in claim 1 wherein said power means is a part of a hydraulic system which drives said gear wheel, a fluid distributor in said system having a gear lever for moving said distributor into position to drive said gear wheel, said lever being so joined with said distributor as to be movable into position to drive said gear wheel only when said slide member is disengaged with said gear wheel.

References Cited

UNITED STATES PATENTS

| | | | |
|---|---|---|---|
| 2,599,592 | 6/1952 | Stewart | 305—10 |
| 2,796,301 | 6/1957 | Lear | 305—9 |
| 3,088,531 | 5/1963 | Garrett | 305—9 |
| 3,312,318 | 4/1967 | Ryan | 180—6.58 X |

FOREIGN PATENTS 127,954   7/1960   Russia.

RICHARD J. JOHNSON, *Primary Examiner.*